United States Patent
Utsumi

(10) Patent No.: US 9,062,137 B2
(45) Date of Patent: Jun. 23, 2015

(54) BLOCK COPOLYMER AND ANTISTATIC AGENT COMPRISING SAME

(75) Inventor: Tetsuhiro Utsumi, Sodegaura (JP)

(73) Assignee: TOHO CHEMICAL INDUSTRY CO., LTD., Tokyo (JP)

( * ) Notice: Subject to any disclaimer, the term of this patent is extended or adjusted under 35 U.S.C. 154(b) by 150 days.

(21) Appl. No.: 13/812,302

(22) PCT Filed: Jul. 26, 2011

(86) PCT No.: PCT/JP2011/066945
§ 371 (c)(1),
(2), (4) Date: Jan. 25, 2013

(87) PCT Pub. No.: WO2012/014882
PCT Pub. Date: Feb. 2, 2012

(65) Prior Publication Data
US 2013/0123434 A1 May 16, 2013

(30) Foreign Application Priority Data
Jul. 26, 2010 (JP) .................. 2010-167529

(51) Int. Cl.
*C08L 71/02* (2006.01)
*C08L 23/26* (2006.01)
*C08F 210/00* (2006.01)
*C08L 23/02* (2006.01)
*C08J 5/18* (2006.01)

(52) U.S. Cl.
CPC .............. *C08F 210/00* (2013.01); *C08L 71/02* (2013.01); *C08L 23/02* (2013.01); *C08J 5/18* (2013.01); *C08J 2387/00* (2013.01); *C08G 2261/126* (2013.01); *C08L 2205/05* (2013.01)

(58) Field of Classification Search
USPC ................................................. 525/89, 90, 91
See application file for complete search history.

(56) References Cited

FOREIGN PATENT DOCUMENTS

| | | |
|---|---|---|
| JP | A-11-170456 | 6/1999 |
| JP | B2-3077847 | 8/2000 |
| JP | A-2001-278985 | 10/2001 |
| JP | A-2002-284880 | 10/2002 |
| JP | A-2004-136480 | 5/2004 |
| JP | A-2006-274123 | 10/2006 |
| JP | A-2007-291376 | 11/2007 |
| JP | A-2010-90189 | 4/2010 |

OTHER PUBLICATIONS

International Search Report issued in International Patent Application No. PCT/JP2011/066945 dated Aug. 23, 2011.

*Primary Examiner* — Jeffrey Mullis
(74) *Attorney, Agent, or Firm* — Oliff PLC

(57) ABSTRACT

There is provided as an antistatic agent that preserves antistatic properties for a long period of time and that does not impair the appearance and transparency of a resin into which the antistatic agent is kneaded, and a resin composition containing the antistatic agent. The antistatic agent including a block copolymer; a thermoplastic resin composition including the antistatic agent; and a film or sheet including the composition.

12 Claims, No Drawings

BLOCK COPOLYMER AND ANTISTATIC AGENT COMPRISING SAME

TECHNICAL FIELD

The present invention relates to an antistatic agent and a resin composition containing the antistatic agent. In particular, the present invention relates to an antistatic agent that has antistatic properties and that does not impair the transparency and appearance of a resin to which the antistatic agent is added, and also relates to a resin composition containing the antistatic agent, and a film and a sheet including the resin composition.

BACKGROUND ART

Generally, synthetic resins have excellent characteristics and hence are used in various applications such as molded products and films. However, synthetic resin products are likely to be electrostatically charged due to the hydrophobicity of synthetic resins. Hence, such a synthetic resin has major drawbacks in that, for example, dirt or dust adheres to a product to deteriorate the appearance of the product, electrical failure is caused during processing, and a malfunction occurs when such a synthetic resin is used in electronic equipment.

Conventionally, as a means to solve these drawbacks, a method of adding various surfactants such as anionic surfactants, cationic surfactants, and nonionic surfactants has been practically employed. The method of adding such a surfactant is excellent in antistatic properties for a short period of time after the formation of a product, but the surfactant bleeds out on a product surface and is removed by, for example, friction and water washing and it is thus difficult to preserve the properties for a long period of time. In addition, the synthetic resin product is molded at a high temperature, which causes thermal decomposition of the surfactant partially, and this may cause smoking during molding and coloring of the product. In order to provide antistatic properties to a multi-layered film and sheet of a synthetic resin, an antistatic agent is required to be added not only to a surface layer but also to a core layer. This increases the amount added, resulting in economic disadvantage.

In recent years, as means for solving the drawbacks and problems caused by using such a surfactant, a formulation containing a polyetheresteramide as a main component and an acid-modified polyolefin or other components as a third component (Patent Document 1) and a polymer antistatic agent having a cationized maleimide structure (Patent Document 2) have been proposed, but they still have insufficient performance. Polymer antistatic agents that are copolymerized products of a modified polyolefin and a multifunctional hydrophilic group have also been proposed (Patent Documents 3 and 4), but there is a problem in that the polymer antistatic agents are effective in a molded product but do not provide stable performance in a film and a sheet. In particular, a film to be used as a member in a touch panel, a deflecting plate, and others is required to have high optical homogeneity, but lines and fisheyes are generated in these related-art films and the films have insufficient appearance and transparency.

RELATED ART DOCUMENTS

Patent Documents

Patent Document 1: Japanese Patent Application Publication No. 11-170456 (JP 11-170456 A) (page 2)

Patent Document 2: Japanese Patent No. 3077847 (pages 1 and 2)
Patent Document 3: Japanese Patent Application Publication No. 2001-278985 (JP 2001-278985 A) (pages 2 to 5)
Patent Document 4: Japanese Patent Application Publication No. 2002-284880 (JP 2002-284880 A) (pages 2 and 3)

SUMMARY OF THE INVENTION

Problem to be Solved by the Invention

The present invention has an object to provide a block copolymer useful as an antistatic agent that preserves antistatic properties for a long period of time and that does not impair the appearance and transparency of a resin into which the antistatic agent is kneaded, and also provide such an antistatic agent and a resin composition containing the antistatic agent.

Means for Solving the Problem

As a result of intensive studies, the inventor of the present invention has found that an antistatic agent including a particular block copolymer can solve the problems, and the invention has been accomplished.

That is, the present invention relates to a block copolymer obtained from a reaction between (a) an acid-modified polyolefin and (b) an alkylene oxide adduct of amide alcohol of General Formula (1), part or all of residual acid groups in the reaction being neutralized by an alkaline substance:

$$R^1\text{—CONH—}R^2\text{—O-(}A^1O)_n\text{-H} \qquad (1)$$

(where $R^1$ is a $C_{1-21}$ linear or branched alkyl group or alkenyl group; $R^2$ is a $C_{1-4}$ linear or branched alkylene group; $A^1$ is a $C_{2-4}$ alkylene group; and n is an integer of 1 to 100).

It is preferable that (a) the acid-modified polyolefin be obtained by modifying one terminal of a polyolefin by an α,β-unsaturated carboxylic acid or an anhydride thereof.

Specifically, it is preferable that (a) the acid-modified polyolefin be polybutenylsuccinic acid or an anhydride thereof.

It is preferable that the block copolymer be a copolymer having an (A)-(B)-(A) type bonding structure, an (A)-(B) type bonding structure, or both the structures where (A) is a block derived from (a) the acid-modified polyolefin and (B) is a block derived from (b) the alkylene oxide adduct of amide alcohol.

Another aspect of the present invention is a block copolymer of General Formula (2):

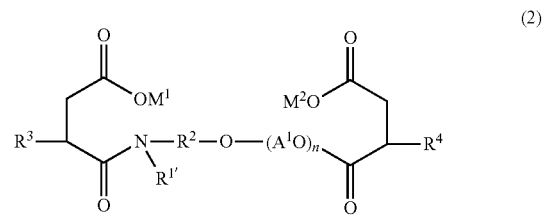

(where $R^{1'}$ is a $C_{2-22}$ linear or branched acyl group; $R^2$ is a $C_{1-4}$ linear or branched alkylene group; $A^1$ is a $C_{2-4}$ alkylene group; n is an integer of 1 to 100; each of $R^3$ and $R^4$ is independently a polyolefin residue; and each of $M^1$ and $M^2$ is independently a hydrogen atom, an alkali metal, an alkaline earth metal, ammonium, or organic ammonium).

Another aspect of the present invention is a block copolymer having a structure of Formula (4) or Formula (5):

(4)

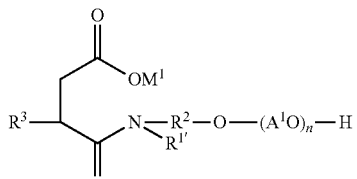

(5)

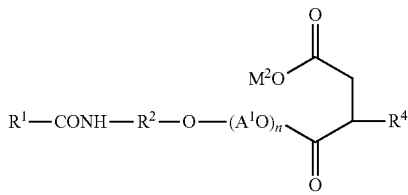

(where $R^1$ is a $C_{1-21}$ linear or branched alkyl group or alkenyl group; $R^{1''}$ is a $C_{2-22}$ linear or branched acyl group; $R^2$ is a $C_{1-4}$ linear or branched alkylene group; $A^1$ is a $C_{2-4}$ alkylene group; n is an integer of 1 to 100; each of $R^3$ and $R^4$ is independently a polyolefin residue; each of $M^1$ and $M^2$ is independently a hydrogen atom, an alkali metal, an alkaline earth metal, ammonium, or organic ammonium).

Another aspect of the present invention is an antistatic agent including the block copolymer.

The antistatic agent of the present invention may further include, in addition to the block copolymer, at least one of block copolymers of General Formula (3) and General Formula (6):

(3)

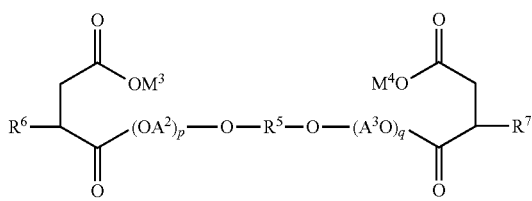

(where $R^5$ is a residue excluding hydroxy groups from a dial compound; each of $A^2$ and $A^3$ is independently a $C_{2-4}$ alkylene group; each of p and q is independently an integer of 0 to 100; each of $R^6$ and $R^7$ is independently a polyolefin residue; and each of $M^3$ and $M^4$ is independently a hydrogen atom, an alkali metal, an alkaline earth metal, ammonium, or organic ammonium)

(6)

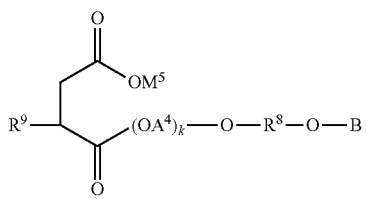

(where $R^8$ is a residue excluding hydroxy groups from a diol compound; $A^4$ is a $C_{2-4}$ alkylene group; k is an integer of 0 to 100; $R^9$ is a polyolefin residue; $M^5$ is a hydrogen atom, an alkali metal, an alkaline earth metal, ammonium, or organic ammonium; and B is a hydrogen atom or a structure of Formula (7):

(7)

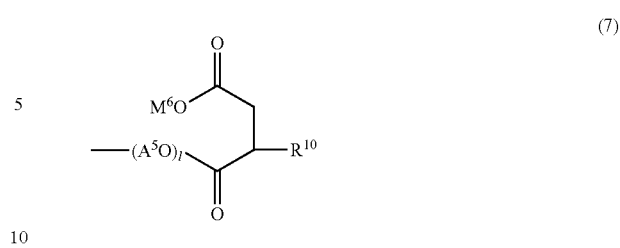

(where $A^5$ is a $C_{2-4}$ alkylene group; l is an integer of 0 to 100; $R^{10}$ is a polyolefin residue; and $M^6$ is a hydrogen atom, an alkali metal, an alkaline earth metal, ammonium, or organic ammonium)).

The present invention also intends to provide a thermoplastic resin composition characterized by including the antistatic agent and a thermoplastic resin and a film or a sheet including the resin composition.

Effects of the Invention

The block copolymer of the present invention can preserve antistatic properties over a long period of time and is suitable as an antistatic agent.

On this account, the antistatic agent of the present invention can provide excellent antistatic properties over a long period of time when the antistatic agent is added to a resin to form a film, a sheet, or other products.

In addition, a resin into which the antistatic agent of the present invention is kneaded has similar viscosity characteristics to those of a blank resin. The antistatic agent therefore has excellent workability and does not impair the original appearance and transparency of the resin after the antistatic agent is kneaded into the resin.

Modes for Carrying out the Invention

The present invention relates to a block copolymer that is obtained from a reaction between (a) an acid-modified polyolefin and (b) an alkylene oxide adduct of amide alcohol, and part or all of residual acid groups in the reaction is neutralized by an alkaline substance, and an antistatic agent including the copolymer.

The present invention will now be described in detail.

[(a) Acid-Modified Polyolefin]

(a) The acid-modified polyolefin can be obtained, for example, by modifying a polyolefin having a double bond at one terminal and/or double bonds at both terminals by an α,β-unsaturated carboxylic acid or an anhydride thereof.

As the polyolefin, a polyolefin obtained by polymerization of a $C_{2-30}$, preferably $C_{2-12}$, and more preferably $C_{2-10}$ olefin or of a mixture of two or more of such olefins (polymerization method) or a low molecular weight polyolefin obtained by thermal degradation of a high molecular weight polyolefin (thermal degradation method) can be used. The polyolefin contains a polyolefin having one terminal and/or both terminals capable of being modified as a main component (50% or more, preferably 75% or more). From the viewpoint of easy modification, the polyolefin preferably has an average terminal double bond amount of 1 to 1.5 per molecule. The polyolefin preferably has a number average molecular weight Mn of 100 to 10,000, more preferably 300 to 7,000, and most preferably 500 to 5,000.

Examples of the $C_{2-30}$ olefin include ethylene, propylene, 1-butene, 2-butene, isobutene; $C_{5-30}$, preferably $C_{5-12}$, and more preferably $C_{5-10}$ α-olefins such as 4-methyl-1-pentene, 1-pentene, 1-octene, 1-decene, and 1-dodecene; and $C_{4-30}$, preferably $C_{4-18}$, and more preferably $C_{4-8}$ dienes such as butadiene, isoprene, cyclopentadiene, and 11-dodecadiene.

Examples of the α,β-unsaturated carboxylic acid or an anhydride thereof used for the acid modification of the polyolefin include monocarboxylic acids, dicarboxylic acids, and anhydrides of them, such as (meth)acrylic acid, maleic acid (anhydride), fumaric acid, itaconic acid (anhydride), and citraconic acid (anhydride). Among them, fumaric acid and maleic acid (anhydride) are preferred and maleic acid (anhydride) is particularly preferred.

Examples of the method of acid-modifying one terminal and/or both terminals of a polyolefin include a method in which a polyolefin having one terminal and/or both terminals capable of being modified, an α,β-unsaturated carboxylic acid or an anhydride thereof, and, as necessary, an organic peroxide are charged in a stainless-steel autoclave followed by nitrogen substitution and the mixture is reacted at a reaction temperature of 150 to 250° C.

In order to synthesize an (A)-(B)-(A) type or an (A)-(B) type block copolymer, the reaction is preferably carried out with no organic peroxide through heat modification. The α,β-unsaturated carboxylic acid or an anhydride thereof is typically used for the modification in an amount of 20 to 0.1% and preferably 10 to 0.5% based on the mass of the polyolefin. The reaction may be performed by either a melting process or a solution process.

The acid modification degree per molecule of a polyolefin having an acid-modified terminal can be determined from a number average molecular weight Mn by GPC and an acid value or a saponification value. In order to synthesize a block copolymer having an (A)-(B)-(A) type bonding structure or an (A)-(B) type bonding structure where (A) is a block derived from (a) the acid-modified polyolefin and (B) is a block derived from (b) the alkylene oxide adduct of amide alcohol, which are described later, the acid modification degree is preferably 0.5 to 1.5 and more preferably 0.7 to 1.0.

As (a) the acid-modified polyolefin, polybutenylsuceinic acid is preferably used because it has one acid-modified terminal and easily affords a block copolymer having an (A)-(B)-(A) type bonding structure or an (A)-(B) type bonding structure where (A) is a block derived from (a) the acid-modified polyolefin and (B) is a block derived from (b) the alkylene oxide adduct of amide alcohol, which are described later.

Here, the polybutenylsuccinic acid includes poly(iso)butenylsuccinic anhydride (PIBSA). PIBSA can be obtained by reacting a homopolymer of isobutene or poly(iso)butene as a copolymer of isobutene and n-butene with maleic anhydride. PIBSA is characterized by having one maleated terminal as shown by the chemical formula.

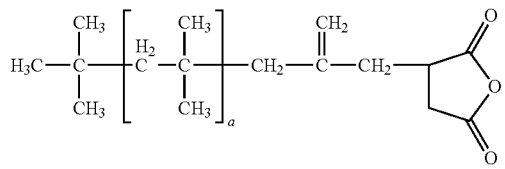

In the chemical formula, a is the repetition number of repeating units.

In a common acid-modified polyolefin, the acid modification treatment can form a polyolefin having one terminal acid-modified and a polyolefin having both terminals acid-modified. On this account, in addition to the (A)-(B)-(A) type block copolymer and the (A)-(B) type block copolymer, a high molecular weight compounds having a structure in which the block (A) and the block (B) are alternately repeatedly bonded can be formed.

In contrast, a polyolefin having one acid-modified terminal, such as PIBSA can afford the (A)-(B)-(A) type block copolymer or the (A)-(B) type block copolymer at high purity.

[(b) Alkylene Oxide Adduct of Amide Alcohol]

(b) The alkylene oxide adduct of amide alcohol of General Formula (1) can be obtained by addition of an alkylene oxide to an amide alcohol by a known method.

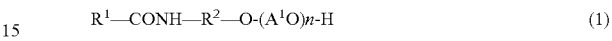

$$R^1\text{—CONH—}R^2\text{—O-}(A^1O)n\text{-H} \qquad (1)$$

In the formula, $R^1$ is a $C_{1-21}$ linear or branched alkyl group or alkenyl group, and $R^2$ is a $C_{1-4}$ linear or branched alkylene group. $A^1$ is a $C_{2-4}$ alkylene group, and n is an integer of 1 to 100.

Specific examples of $R^1$ include a methyl group, an ethyl group, a propyl group, an isopropyl group, a butyl group, an isobutyl group, a sec-butyl group, a tert-butyl group, a pentyl group, a hexyl group, a heptyl group, an octyl group, a decyl group, dodecyl groups such as a lauryl group, tetradecyl groups such as a myristyl group, hexadecyl groups such as a palmityl group, octadecyl groups such as a stearyl group, an oleyl group, an eicosyl group, and a behenyl group. Specific examples of $R^2$ include a methylene group, an ethylene group, a propylene group, and a butylene group.

Specific examples of ($A^1O$) include an ethyleneoxy group, a propyleneoxy group, and a butyleneoxy group.

The amide alcohol can be produced, for example, by amidation reaction of an alkanolamine with a carboxylic acid or a reactive derivative of the carboxylic acid (for example, an ester compound of the carboxylic acid).

Examples of the alkanolamine include monoethanolamine, n-propanolamine, and isopropanolamine.

Examples of the carboxylic acid or the reactive derivative of the carboxylic acid include carboxylic acids or alkyl esters of carboxylic acids, such as formic acid, acetic acid, propionic acid, methyl formate, ethyl formate, methyl acetate, ethyl acetate, methyl propionate, ethyl propionate, methyl laurate, methyl myristate, methyl palmitate, methyl stearate, methyl oleate, and methyl behenate.

Examples of the alkylene oxide to be added to the amide alcohol include $C_{2-4}$ alkylene oxides such as ethylene oxide, propylene oxide, and butylene oxide, and one or two or more of the oxides can be used. The addition of an alkylene oxide can be carried out, for example, in the presence of an alkali catalyst at a temperature of 80 to 200° C.

In General Formula (1), n is typically an integer of 1 to 100, preferably 4 to 60, and particularly preferably 6 to 40. When n is 2 or more and ($A^1O$)n includes two or more types of alkyleneoxy groups, the bonding manner may be a block manner, a random manner, or a combination of them.

[Block Copolymers]

The block copolymer of the present invention is obtained from a reaction between (a) the acid-modified polyolefin and (b) the alkylene oxide adduct of amide alcohol and is characterized in that part or all of residual acid groups in the reaction is neutralized by an alkaline substance.

For example, when (a) is a polyolefin having one terminal modified by maleic anhydride, the reaction of (a) and (b) leads to ring opening of the structure derived from maleic anhydride in (a) and a residual, free carboxy group forms a salt together with an alkali compound, resulting in a half-ester amide as the block copolymer.

(a) The acid-modified polyolefin and (b) the alkylene oxide adduct of amide alcohol may be reacted in the presence of a catalyst at 150 to 250° C. The catalyst may be an acid catalyst or an alkali catalyst, but is preferably an alkali catalyst because it can also be used for the neutralization of an acid group without treatment. As the alkali catalyst, alkaline substances exemplified later as those used for the neutralization of an acid group can be suitably used.

As the catalyst, antimony catalysts such as antimony trioxide; tin catalysts such as monobutyltin oxide; titanium catalysts such as tetrabutyl titanate; zirconium catalysts such as tetrabutyl zirconate; organic acid metal salt catalysts such as zirconyl acetate and zinc acetate; palladium catalysts such as palladium acetate and tetrakis(triphenylphosphine)palladium; and a combination of two or more of them may be used. Among them, zirconium catalysts and organic acid metal salt catalysts are preferred, and zirconyl acetate is specifically preferred. When such an organic metal salt catalyst is used, residual acid groups are required to be neutralized by an alkaline substance, and the neutralization process may be performed before the reaction of a block copolymer or after the reaction. As the alkaline substance used here, alkaline substances exemplified later as those used for the neutralization of residual acid groups can be suitably used.

The reaction ratio of (a) the acid-modified polyolefin and (b) the alkylene oxide adduct of amide alcohol is not particularly limited but is preferably as close to (a):(b) 2:1 as possible in order that an (A)-(B)-(A) type block copolymer described later is effectively obtained.

Examples of the alkaline substance used for the neutralization of residual acid groups after the reaction of (a) the acid-modified polyolefin and (b) the alkylene oxide adduct of amide alcohol include hydroxides and carbonates of alkali metals such as lithium, potassium, and sodium; hydroxides and carbonates of alkaline earth metals such as calcium and magnesium; ammonia; and organic amines.

Specific examples of the alkaline substance include, but are not necessarily limited to, sodium hydride, potassium hydride, calcium hydride, sodium ethoxide, sodium methoxide, sodium tert-butoxide, potassium tert-butoxide, n-butyllithium, sec-butyllithium, lithium diisopropylamide, sodium amide, lithium bistrimethylsilylamide, sodium carbonate, potassium carbonate, sodium hydrogen carbonate, potassium hydrogen carbonate, lithium hydroxide, sodium hydroxide, potassium hydroxide, barium hydroxide, calcium hydroxide, sodium phosphate, potassium phosphate, calcium phosphate, sodium acetate, potassium acetate, sodium sulfate, potassium sulfate, magnesium sulfate, sodium silicate, lithium silicate, sodium tripolyphosphate, sodium ethylenediaminetetraacetate, sodium nitrilotriacetate, sodium p-toluenesulfonate, potassium p-toluenesulfonate, sodium metaborate, sodium citrate, potassium citrate, sodium ethylenediaminetetraacetate, sodium nitrilotriacetate, sodium hydroxyethylethylenediaminetriacetate, sodium diethylenetriaminepentaacetate, sodium uracildiacetate, and sodium thiosulfate.

Among these alkaline substances, hydroxides of alkali metals such as potassium and sodium are preferred from the viewpoint of antistatic properties.

The ratio of acid groups forming salts by the neutralization process with an alkaline substance is not necessarily required to be 100% of acid groups remaining after the reaction of (a) an acid-modified polyolefin and (b) an alkylene oxide adduct of amide alcohol, but is preferably 30% by mol or more and more preferably 50% by mol or more from the viewpoint of antistatic properties.

In order to neutralize residual acid groups as much as possible, an alkaline substance may be used in an amount of 100% by mol or more with respect to residual acid groups. The amount used is preferably 10 to 200% by mol, more preferably 30 to 150% by mol, and even more preferably 50 to 100% by mol, with respect to residual acid groups. In order to suppress bleeding out when the block copolymer is used as an antistatic agent, the alkaline substance except a metal salt part is preferably removed by degassing under reduced pressure after the neutralization process.

As the block copolymer, a block copolymer having an (A)-(B)-(A) type bonding structure or an (A)-(B) type bonding structure is preferred, and a block copolymer having an (A)-(B)-(A) type bonding structure is particularly preferred where (A) is a block derived from (a) the acid-modified polyolefin and (B) is a block derived from (b) the alkylene oxide adduct of amide alcohol, because such a block copolymer does not impair the appearance and transparency of a film or a sheet. This is supposed to be because the (A)-(B)-(A) type block copolymer has a medium molecular weight between a related-art low molecular antistatic agent and a polymer antistatic agent, improves the bleeding out problem and the smoking problem during film production of a low molecular antistatic agent, and has higher compatibility with a resin than that of a polymer antistatic agent.

Generally, the "(A)-(B)-(A) type block copolymer" means a copolymer having a bilaterally symmetric structure in which the (B) block is disposed at the center in many cases. However in the present invention, the block (B) derived from (b) the alkylene oxide adduct of amide alcohol has one terminal with a group derived from an amide bond and has the other terminal with a group derived from an alkylene oxide as an adduct. On this account, in the (A)-(B)-(A) type block copolymer, two bonding groups of the blocks (A) derived from (a) the acid-modified polyolefin to the block (B) derived from (b) the alkylene oxide adduct of amide alcohol are different from each other (in other words, the structure is bilaterally asymmetric).

The (A)-(B)-(A) type block copolymer includes a block copolymer of General Formula (2).

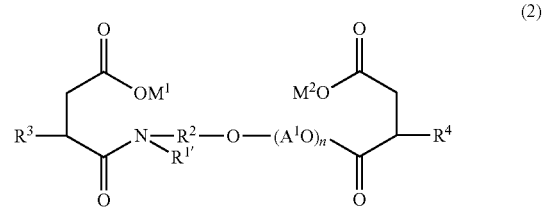

(2)

In the formula, $R^{1\prime}$ is a $C_{2-22}$ linear or branched acyl group, $R^2$ is a $C_{1-4}$ linear or branched alkylene group, $A^1$ is a $C_{2-4}$ alkylene group, n is an integer of 1 to 100, each of $R^3$ and $R^4$ is independently a polyolefin residue, and each of $M^1$ and $M^2$ is independently a hydrogen atom, an alkali metal, an alkaline earth metal, ammonium, or organic ammonium.

In General Formula (2), $R^{1\prime}$ is a $C_{2-22}$ linear or branched acyl group and can be represented by $R^1CO$. $R^1$ is the same as defined in Formula (1) and examples include a methyl group, an ethyl group, a propyl group, and a butyl group.

Specific examples of $R^2$ are the same as defined in Formula (1) and include a methylene group, an ethylene group, a propylene group, and a butylene group.

Specific examples of $A^1$ include an ethylene group, a propylene group, and a butylene group, and specific examples of ($A^1O$) is accordingly an ethyleneoxy group, a propyleneoxy group, and a butyleneoxy group as with the definition in Formula (1).

n is the same as defined in Formula (1) and is typically an integer of 1 to 100, preferably 4 to 60, and particularly preferably 6 to 40.

$R^3$ and $R^4$ are a polyolefin residue and specific examples include a residue derived from polyolefin exemplified above. $R^3$ and $R^4$ are preferably a poly(iso)butenyl group. Examples of $M^1$ and $M^2$ include a hydrogen atom; alkali metals such as lithium, potassium, and sodium; alkaline earth metals such as calcium and magnesium; ammonium; and organic ammoniums.

The (A)-(B) type block copolymer includes block copolymers having structures of General Formula (4) and General Formula (5).

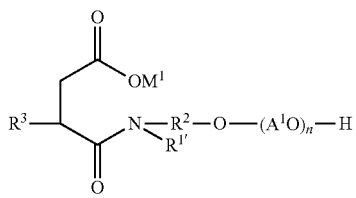

(4)

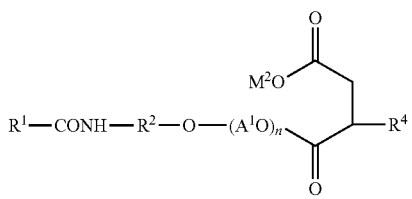

(5)

In the formulae, $R^1$ is a $C_{1-21}$ linear or branched alkyl group or alkenyl group, $R^{1'}$ is a $C_{2-22}$ linear or branched acyl group, $R^2$ is a $C_{1-4}$ linear or branched alkylene group, $A^1$ is a $C_{2-4}$ alkylene group, n is an integer of 1 to 100, each of $R^3$ and $R^4$ is independently a polyolefin residue, and each of $M^1$ and $M^2$ is independently a hydrogen atom, an alkali metal, an alkaline earth metal, ammonium, or organic ammonium.

In General Formula (4) and General Formula (5), $R^1$, $R^{1'}$, $R^2$, $A^1$, and n are the same as defined in Formula (1).

$R^3$, $R^4$, $M^1$, and $M^2$ are also the same as defined in the above.

[Antistatic Agents]

The block copolymer can be suitably used especially as an antistatic agent.

When the block copolymer of the present invention is used as an antistatic agent, the block copolymer alone can provide sufficient effect. However, at least one of a block copolymer of General Formula (3) and a block copolymer of General Formula (6) may be used in combination as long as the object of the present invention is not impaired.

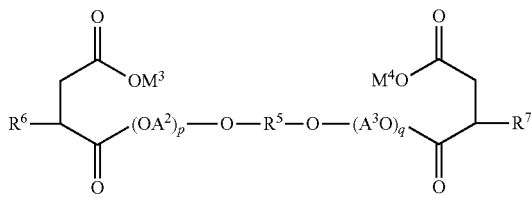

(3)

(In the formula, $R^5$ is a residue excluding hydroxy groups from a diol compound, each of $A^2$ and $A^3$ is independently a $C_{2-4}$ alkylene group, each of p and q is independently an integer of 0 to 100, $R^6$ and $R^7$ are a polyolefin residue, and each of $M^3$ and $M^4$ is independently a hydrogen atom, an alkali metal, an alkaline earth metal, ammonium, or organic ammonium)

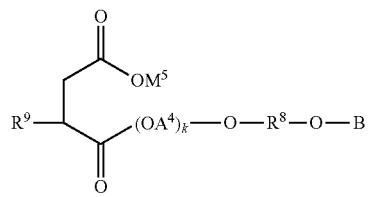

(6)

(In the formula, $R^8$ is a residue excluding hydroxy groups from a diol compound, $A^4$ is a $C_{2-4}$ alkylene group, k is an integer of 0 to 100, $R^9$ is a polyolefin residue, $M^5$ is a hydrogen atom, an alkali metal, an alkaline earth metal, ammonium, or organic ammonium, and 13 is a hydrogen atom or a structure of Formula (7):

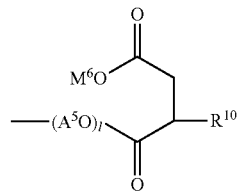

(7)

(in the formula, $A^5$ is a $C_{2-4}$ alkylene group, l is an integer of 0 to 100, $R^{10}$ is a polyolefin residue, and $M^6$ is a hydrogen atom, an alkali metal, an alkaline earth metal, ammonium, or organic ammonium))

The block copolymer of General Formula (3) or General Formula (6) can be obtained in the same manner as that for the block copolymer of General Formula (2) except that a polyether diol is used in place of (b) the alkylene oxide adduct of amide alcohol. The block copolymer may be a mixture with the block copolymer of General Formula (2) that is obtained by the reaction of a mixture of (b) the alkylene oxide adduct of amide alcohol and a polyether diol with a polyolefin having one acid-modified terminal.

The polyether dial is obtained by addition of an alkylene oxide to a diol compound. Examples of the polyether diol include polyethylene glycol, polypropylene glycol, and a compound of the general formula: H—$(OA^2)$p-O—$R^5$—O-$(A^3O)$q-H. In the formula, $R^5$ is a residue excluding hydroxy groups from a diol, $A^2$ and $A^3$ are a $C_{2-4}$ alkylene group, and p and q are the addition number of alkylene oxides per hydroxy group in a diol. p pieces of ($OA^2$) and q pieces of ($A^3O$) may be the same oxyalkylene group or different types of oxyalkylene groups. When the polyether diol includes two or more types of oxyalkylene groups, the bonding manner may be a block manner, a random manner, or a combination of them. p and q are typically an integer of 0 to 100, preferably 2 to 30, and particularly preferably 3 to 10. p and q may be the same as or different from each other.

Examples of the diol compound include divalent alcohols (for example, a $C_{2-12}$ aliphatic, alicyclic, or aromatic divalent alcohol), $C_{6-18}$ divalent phenols, and diols containing a tertiary amino group.

Examples of the aliphatic divalent alcohol include alkylene glycols (ethylene glycol and propylene glycol), 1,4-butanediol, 1,6-hexanediol, neopentyl glycol, and 1,12-dodecanediol. Examples of the alicyclic divalent alcohol include cyclohexanedimethanol and hydrogenated bisphenol, and examples of the aromatic divalent alcohol include xylylene diol.

Examples of the divalent phenol include monocyclic divalent phenols (such as hydroquinone, catechol, resorcin, and urushiol), bisphenols (such as bisphenol A, bisphenol F, bisphenol S, 4,4'-dihydroxydiphenyl-2,2-butane, and dihydroxybiphenyl), bisphenoxy(ethanol)fluorene, and condensed polycyclic divalent phenols (such as dihydroxynaphthalene and binaphthol).

Examples of the tertiary amino group-containing diol include bis-hydroxyalkylated compounds of $C_{1-30}$ aliphatic or alicyclic primary monoamines (such as methylamine, ethylamine, cyclopropylamine, 1-propylamine, 2-propylamine, amylamine, isoamylamine, hexylamine, 1,3-dimethylbutylamine, 3,3-dimethylbutylamine, 2-aminoheptane, 3-aminoheptane, cyclopentylamine, hexylamine, cyclohexylamine, heptylamine, nonylamine, decylamine, undecylamine, and dodecylamine) and bis-hydroxyalkylated compounds of $C_{6-12}$ aromatic primary monoamines (such as aniline and benzylamine).

Among these dial compounds, aliphatic divalent alcohols and (hydrogenated) bisphenols are preferred, and ethylene glycol and (hydrogenated) bisphenol A are particularly preferred.

Examples of the alkylene oxide to be added to the diol compound include $C_{2-4}$ alkylene oxides such as ethylene oxide, propylene oxide, and butylene oxide, and these compounds may be used singly or in combination of two or more of them. The addition of an alkylene oxide can be carried out, for example, in the presence of an alkali catalyst at a temperature of 80 to 200° C.

A usable polyether diol is a polyethylene glycol or an ethylene oxide adduct of (hydrogenated) bisphenol A preferably having a molecular weight of 300 to 2,000 and more preferably having a molecular weight of 500 to 1,000. Two or more types of polyether dials may be used in combination.

[Resin Compositions]

The present invention also relates to a thermoplastic resin composition containing the antistatic agent and a thermoplastic resin.

Examples of the thermoplastic resin include polyolefin resins, polystyrene resins, acrylic resins, vinyl resins, polyamide resins, polyester resins, polyacetal resins, polycarbonate resins, thermoplastic polyurethane resins, fluorine resins, and mixtures of two or more of them.

Examples of the polyolefin resin include homopolymers of α-olefins such as ethylene, propylene, 1-butene, 1-pentene, 1-hexene, and 4-methyl-1-pentene; copolymers of the α-olefins; copolymers of the α-olefin and an additional monomer copolymerizable with the α-olefin; and mixtures of them. Examples of the additional monomer copolymerizable with the α-olefin include vinyl acetate, maleic acid, methacrylic acid, methyl methacrylate, and ethyl methacrylate.

Examples of the polystyrene resin include homopolymers of styrenes and copolymers of styrenes and a monomer polymerizable with styrenes. Specific examples of the polystyrene resin include polystyrenes, acrylonitrile-styrene (AS) resins, and acrylonitrile-butadiene-styrene (ABS) resins.

Examples of the vinyl resin include diene polymers such as butadiene resins and polyisoprene resins.

Examples of the polyamide resin include nylons.

Examples of the polyester resin include aromatic polyesters such as polyethylene terephthalates, polybutylene terephthalates, and polyethylene naphthalates; and aliphatic polyesters such as polybutylene adipates, polyethylene adipates, polybutylene succinates, polyethylene succinates, polybutylene succinate adipates, polyethylene succinate adipates, polycaprolactones, and polylactic acids.

Examples of the polyacetal resin include polymers of formaldehyde or trioxane.

Examples of the polycarbonate resin include a condensate of bisphenol A and phosgene and condensates of bisphenol A and a carbonate diester.

Examples of the thermoplastic polyurethane resin include reaction between an organic diisocyanate and a polymer diol.

Examples of the fluorine resin include polymers of a fluorine-containing monomer.

Among these thermoplastic resins, a polyolefin resin is particularly preferred.

In the thermoplastic resin composition of the present invention, the antistatic agent is preferably contained in an amount of 3 to 30% by mass and more preferably 5 to 20% by mass with respect to the total mass of the thermoplastic resin.

The antistatic agent of the present invention alone can provide sufficient effect. However, in addition to the antistatic agent of the present invention, as necessary, a known anionic surfactant, a cationic surfactant, a nonionic surfactant, and an amphoteric surfactant may be used alone or in combination of two or more of them, as long as the object of the present invention is not impaired. The thermoplastic resin composition may further include a polymer antistatic agent such as polyetheresteramides, an antioxidant, a lubricant, a coloring agent, an ultraviolet absorber, and various additives and fillers that are commonly added to a resin product as additional components.

Examples of the anionic surfactant include alkylsulfuric acids and salts of them such as sodium lauryl sulfate, potassium lauryl sulfate, sodium myristyl sulfate, potassium myristyl sulfate, sodium cetyl sulfate, sodium stearyl sulfate, sodium oleyl sulfate, and triethanolamine lauryl sulfate; alkyl ether sulfuric acids and salts of them such as sodium polyoxyethylene lauryl ether sulfate, sodium polyoxyethylene cetyl ether sulfate, sodium polyoxyethylene oleyl ether sulfate, and triethanolamine polyoxyethylene lauryl ether sulfate; alkyl aryl ether sulfuric acids and salts of them such as sodium polyoxyethylene octylphenyl ether sulfate; alkylamide sulfuric acid and salts of them such as sodium polyoxyethylene lauramide ether sulfate, triethanolamine polyoxyethylene lauramide ether sulfate, sodium polyoxyethylene myristamide ether sulfate, sodium polyoxyethylene oleamide ether sulfate, sodium polyoxyethylene cocamido ether sulfate, and sodium oleamide ether sulfate; acyl ester sulfuric acids and salts of them such as sodium hydrogenated coconut oil fatty acid glycerin sulfate; alkylsulfonic acids and salts of them such as sodium lauryl sulfonate, sodium myristyl sulfonate, and sodium coconut alkyl sulfonate; alkylbenzenesulfonic acids and salts of them such as sodium dodecylbenzenesulfonate and triethanolamine dodecylbenzenesulfonate; alkylnaphthalenesulfonic acid and salts of it; formalin condensed sulfonic acids and salts of them such as a formalin polycondensation product of a naphthalenesulfonate; sulfosuccinic acids and salts of them such as disodium lauryl sulfosuccinate, sodium di-2-ethylhexyl sulfosuccinate, disodium lauryl polyoxyethylenesulfosuccinates, and disodium oleamide sulfosuccinate; α-olefin sulfonic acids and salts of them such as sodium dodecenesulfonate, sodium tetradecenesulfonate, potassium dodecenesulfonate, and potassium tetradecenesulfonate;

α-sulfofatty acid esters and salts of them such as α-sulfolauric acid methyl ester, α-sulfomyristic acid methyl ester, and α-sulfolauric acid (EO)n methyl ester; N-acyl methyl-taurines and salts of them such as potassium cocoyl acyl-N-methyl taurate, sodium lauroyl-N-methyl taurate, potassium lauroyl-N-methyl taurate, triethanolamine lauroyl-N-methyl taurate, sodium myristoyl-N-methyl taurate, triethanolamine myristoyl-N-methyl taurate, sodium cocoyl acyl-N-methyl taurate, and triethanolamine cocoyl acyl-N-methyl taurate; N-acyl glutamic acids and salts of them such as potassium cocoyl acyl-glutamate, sodium cocoyl acyl-glutamate, triethanolamine cocoyl acyl-glutamate, sodium lauroyl-glutamate, potassium myristoyl-glutamate, sodium myristoyl-glutamate, and sodium palm oil fatty acid acyl-glutamate; N-acyl glycines and salts of them such as sodium N-lauroyl glycine, triethanolamine N-myristoyl glycine, sodium N-cocoyl acyl-glycine, and potassium N-cocoyl acyl-glycine; acyl isethionic acids and salts of them such as sodium lauroyl isethionate, sodium myristoyl isethionate, and sodium cocoyl acyl isethionate; alkyl sulfoacetates; alkyl ether phosphoric acids and salts of them such as sodium polyoxyethylene lauryl ether phosphate, sodium polyoxyethylene cetyl ether phosphate, potassium polyoxyethylene myristyl phosphate, sodium polyoxyethylene oleyl ether phosphate, and sodium dipolyoxyethylene oleyl ether phosphate; alkyl aryl ether phosphoric acids and salts of them; fatty acid amide ether phosphoric acids and salts of them such as sodium polyoxyethylene lauramide ether phosphate; alkyl phosphoric acids and salts of them such as sodium lauryl phosphate, sodium myristyl phosphate, sodium cocoyl phosphate, potassium myristyl phosphate, triethanolamine lauryl phosphate, and diethanolamine oleyl phosphate; acyliminodiacetic acids and salts of them such as sodium lauroyliminodiacetate, triethanolamine lauroyliminodiacetate, sodium cocoyl acyliminodiacetate, disodium lauroyliminodiacetate, and sodium palm kernel fatty acid iminodiacetate; ether carboxylic acids and salts of them such as sodium polyoxyethylene lauryl ether acetate, potassium polyoxyethylene myristyl ether acetate, triethanolamine polyoxyethylene palmityl ether acetate, sodium polyoxyethylene stearyl ether acetate, and sodium polyglyceryl lauryl ether acetate; acylated peptides such as coconut oil fatty acid silk peptide; amide ether carboxylic acids and salts of them such as sodium polyoxyethylene lauramide ether carboxylate, sodium polyoxyethylene myristamide ether carboxylate, and triethanolamine polyoxyethylene cocamido ether carboxylate; acyl lactic acid salts; and alkenyl succinic acids and salts of them.

Examples of the cationic surfactant include monoalkyl quaternary ammonium salts such as lauryltrimethylammonium chloride, myristyltrimethylammonium chloride, palmityltrimethylammonium chloride, stearyltrimethylammonium chloride, oleyltrimethylammonium chloride, cetyltrimethylammonium chloride, behenyltrimethylammonium chloride, coconut alkyltrimethylammonium chloride, beef tallow alkyltrimethylammonium chloride, stearyltrimethylammonium bromide, coconut alkyltrimethylammonium bromide, and cetyltrimethylammonium methyl sulfate; dialkyl quaternary ammonium salts such as dioctyldimethylammonium chloride, dilauryldimethylammonium chloride, and distearyldimethylammonium chloride; triethylmethylammonium methyl carbonate; acylaminoalkyl quaternary ammonium salts such as lanolin fatty acid aminopropylethyldimethylammonium ethylsulfate and lauroylaminoethylmethyldiethylammonium methylsulfate; alkyl ethenoxy quaternary ammonium salts such as dipalmitylpolyethenoxyethylammonium chloride and distearylpolyethenoxymethylammonium chloride; alkyl isoquinolinium salts such as lauryl isoquinolinium chloride; benzalkonium salts such as lauryldimethylbenzylammonium chloride and stearyldimethylbenzylammonium chloride; benzethonium salts such as benzyldimethyl{2-[2-(p-1,1,3,3-tetramethylbutylphenoxy)ethoxy]ethyl}ammonium chloride; pyridinium salts such as cetylpyridinium chloride; imidazolinium salts; tributylmethylphosphonium methyl carbonate; acylated basic amino acid alkyl ester salts such as N-cocoylarginine ethyl ester pyrrolidone carboxylate and N-lauroyllysine ethyl ethyl ester hydrochloride; primary amine salts such as laurylamine hydrochloride; secondary amine salts such as dilaurylamine acetate; tertiary amine salts; fatty acid amide guanidinium salts; and alkyl trialkylene glycol ammonium salts such as lauryl triethylene glycol ammonium hydroxide.

Examples of the nonionic surfactant include polyoxyethylene alkyl ethers such as polyoxyethylene (POE) octyl ether, POE (2-ethyl-hexyl)ether, POE lauryl ether, POE myristyl ether, POE cetyl ether, POE stearyl ether, POE oleyl ether, POE isostearyl ether, POE behenyl ether, and polyoxyethylene cetyl stearyl diether; polyoxyethylene polyoxypropylene glycol surfactants such as POE/polyoxypropylene (POP) butyl ether, POE/POP lauryl ether, POE/POP cetyl ether, and POE/POP glycol; polyoxyethylene aryl ethers such as POE octylphenyl ether, POE nonylphenyl ether, POE chlorophenyl ether, and POE naphthyl ether; POE hydrogenated castor oil ether and POE castor oil ether; other ether surfactants such as POE lanolin alcohol ether and POE phytosterol; polyoxyethylene glycerin fatty acid esters such as POE glyceryl monostearate and POE glyceryl oleate; polyoxyethylene sorbitan fatty acid esters such as POE sorbitan monolaurate, POE sorbitan monostearate, POE sorbitan tristearate, and POE sorbitan monoisostearate; polyoxyethylene sorbitol fatty acid esters such as POE sorbitol hexastearate, POE sorbitol tetrastearate, POE sorbitol tetraoleate, and POE sorbitol monolaurate; polyethylene glycol fatty acid esters such as polyethylene glycol monolaurate, polyethylene glycol monostearate, polyethylene glycol monooleate, polyethylene glycol distearate, polyethylene glycol dioleate, and polyethylene glycol diisostearate; ether ester surfactants such as polyethylene glycol lanolin fatty acid ester; glycerin fatty acid esters such as glyceryl monostearate, self-emulsifiable glyceryl monostearate, glyceryl monohydroxystearate, and glyceryl distearate; polyglycerin fatty acid esters such as diglyceryl monostearate, diglyceryl monooleate, diglyceryl dioleate, diglyceryl monoisostearate, tetraglyceryl monostearate, tetraglyceryl tristearate, tetraglyceryl pentastearate, hexaglyceryl monolaurate, hexaglyceryl monomyristate, decaglyceryl distearate, and decaglyceryl diisostearate; sorbitan fatty acid esters such as sorbitan monolaurate, sorbitan monostearate, sorbitan monooleate, sorbitan trioleate, sorbitan tristearate, and sorbitan monoisostearate; ethylene glycol fatty acid esters such as ethylene glycol monolaurate and ethylene glycol distearate; propylene glycol fatty acid esters such as propylene glycol monostearate and self-emulsifiable propylene glycol monostearate; pentaerythritol fatty acid esters such as pentaerythritol monostearate and pentaerythritol monooleate; sugar derivatives such as maltitol hydroxy fatty acid ethers, alkylated polysaccharides, alkyl(poly)glucosides, and sugar esters; alkyl glyceryl ethers such as α-monoisostearyl glyceryl ether; organic acid monoglycerides such as acetyl-monoglyceride, lactic acid monoglyceride, and citric acid monoglyceride; fatty acid alkanolamides such as coconut oil fatty acid monoethanolamide, lauroyl monoethanolamide, myristoyl monoethanolamide, lauroyl diethanolamide, coconut oil fatty acid diethanolamide, lauroyl isopropanolamide, myristoyl isopropanolamide, coconut oil fatty acid isopropanolamide, POE lauroyl monoethanolamide, coconut oil fatty acid methylmonoethanolamide, and coconut oil fatty acid methyldiethanolamide; POE alkylamines such as POE laurylamine and POE stearylamine; and amine oxides such as lauryldimethylamine oxide, cocodimethylamine oxide, and cocamide propyldimethylamine oxide.

Examples of the amphoteric surfactant include carboxybetaine surfactants such as lauryl dimethyl betaine, myristyl dimethyl betaine, palmityl dimethyl betaine, stearyl dimethyl betaine, oleyl dimethyl betaine, coconut alkyl dimethyl betaine, lauryl methyl ethyl betaine, octadecyloxymethyl dimethyl betaine, lauryl dihydroxyethyl betaine, stearyl dihydroxyethyl betaine, coconut alkyl dihydroxyethyl betaine, lauramidopropyl dimethyl betaine, myristamidopropyl dimethyl betaine, stearamidopropyl dimethyl betaine, oleamidopropyl dimethyl betaine, and cocamidopropyl dimethyl betaine; glycine surfactants represented by $RN^+H_2CH_2COO^-$ (R: alkyl), such as laurylglycine, stearylglycine, sodium lauryldiaminoethylglycinate, alkyl aminoethylglycine chloride, and disodium cocoyl acyl-N-carboxyethoxyethyl-N-carboxyethyl ethylenediamine; aminopropionic acid surfactants represented by $RN^+H_2CH_2CH_2COO^-$ (R: alkyl), such as lauryl-β-alanine and stearyl-β-alanine; sulfobetaine surfactants such as sodium laurylsulfoacetate, sodium tetradecenesulfonate, sodium sulfosuccinate di(2-ethylhexyl), lauryl dimethylhydroxypropyl sulfobetaine, myristyl dimethylhydroxypropyl sulfobetaine, lauryl dimethylpropyl sulfobetaine, coconut alkyl dimethylpropyl sulfobetaine, and lauramide propyl dimethylhydroxypropyl sulfobetaine; sulfonic acid surfactants represented by $RN^+H_2CH_2CH_2SO_3-$ (R: alkyl); sulfuric acid surfactants represented by $RN^+H_2CH_2CH_2OSO_3^-$ (R: alkyl); aminocarboxylic acid salt surfactants such as sodium laurylaminopropionate, sodium laurylaminodipropionate, disodium N-lauroyl-N-hydroxyethyl-N-dicarboxyethyl-ethylenediamine, sodium N-lauroyl-N-hydroxyethyl-N'-carboxyethyl-ethylenediamine, sodium N-lauroyl-N'-carboxymethyl-N'-hydroxyethylethylenediamine, sodium N-cocoyl acyl-N'-carboxyethyl-N'-hydroxyethylethylenediamine, disodium N-lauroyl-N-hydroxyethyl-N-dicarboxymethyl-ethylenediamine, sodium N-lauroyl-N-hydroxyethyl-N'-carboxymethyl-ethylenediamine, sodium N-hydroxydodecyl-N-polyoxyethylene-N-carboxyethyl-N'-polyoxyethylene ethylenediamine, and sodium cocoyl acyl-N-hydroxyethyl ethylenediamine; imidazoline surfactants such as 2-lauryl-N-carboxymethyl-N-hydroxyethyl imidazolinium betaine, 2-myristyl-N-carboxymethyl-N-hydroxyethyl imidazolinium betaine, 2-stearyl-N-carboxymethyl-N-hydroxyethyl imidazolinium betaine, and 2-cocoalkyl-N-carboxymethyl-N-hydroxyethyl imidazolinium betaine; phosphoric acid surfactants represented by $RN^+H_2CH(CH_3)P(OH)O_2^-$ (R: alkyl); lecithin; and aminoacetic acid betaine surfactants such as lauryl dimethylaminoacetic acid betaine and cocamide propyl dimethylaminoacetic acid betaine.

The antistatic agent of the present invention can afford a resin composition through a masterbatch. For example, the block copolymer or a mixture of an antistatic agent containing the block copolymer and the known surfactant can be blended with a thermoplastic resin and the blend can be kneaded to prepare a masterbatch. The masterbatch can be prepared by a method using a single screw extruder, a twin screw extruder, or a multi-screw extruder, but is preferably prepared using a twin screw extruder from the viewpoint of the cost and dispersibility. In particular, by using such a masterbatch, the antistatic agent can be homogeneously dispersed during the process into a molded product.

[Films and Sheets Including Resin Composition]

The thermoplastic resin composition containing the antistatic agent of the present invention is a material suitably applied to a known, publicly used molding method. Examples of the obtained molded article include, but are not particularly limited to, thermoformed articles including films and sheets, monofilaments, multifilaments such as fibers and nonwoven fabrics, injection molded articles, blow molded articles, laminates, foams, and vacuum formed articles. The resin composition containing the antistatic agent of the present invention has good moldability during stretching oriented crystallization, remarkably provides the effects of the present invention, and is suitably used for the production of films and sheets, tape yarns, stretch blow molded articles, and (mono, multi)-filaments that are obtained by stretching.

Examples of the molding method of a molded article obtained from the resin composition containing the antistatic agent of the present invention include thermoforming such as injection molding, blow molding (injection stretch blowing, extrusion stretch blowing, and direct blowing), ballooning, inflation molding, coextrusion method, calendering, hot pressing, solvent casting, (stretch) extrusion molding, extrusion lamination of paper and aluminum, contour extrusion molding, and vacuum (pressure) forming; melt spinning (such as monofilament method, multifilament method, spun-bond method, melt blown method, and split yarn method); foam molding; and compression molding. Any of these methods may be employed.

In particular, a formation method capable of including a stretching oriented crystallization process, such as extrusion molding and melt spinning is more preferably employed because such a method can improve practical strength and appearance such as strength, heat resistance, impact resistance, and transparency of a molded article to be obtained. The molded article obtained from the resin composition containing the antistatic agent of the present invention includes, for example, a molded article obtained by a known, publicly used formation method, and the shape, size, thickness, design, and others of the molded article are not limited.

The molded article that is obtained from the resin composition containing the antistatic agent of the present invention by the formation method described above, such as bottles, films and sheets, hollow tubes, laminates, vacuum (pressure)-formed containers, (mono, multi)-filaments, nonwoven fabrics, and foams, can be suitably used as a material for a wide variety of products, for example, various packaging films for food, electronic products, medical products, pharmaceuticals, cosmetic products, and others, including shopping bags, paper bags, shrink films, garbage bags, compost bags, lunch boxes, containers for pre-cooked food, packaging films for food and confectionery, wrap for food, wrap for cosmetics and perfumery products, diapers, sanitary napkins, wrap for medical drugs, wrap for pharmaceuticals, wrap for surgical patches applicable to shoulder stiffness, a sprain, and others, agricultural/horticultural films, wrap for agrochemicals, films for a greenhouse use, fertilizer bags, packaging bands, packaging films for a magnetic tape cassette product such as video products, audio products, and others, packaging films for a flexible disk, films for a printing plate use, adhesive tape, tapes, yarns, seedling pots, tarpaulins, bags for a sandbag use, films for a building use, weed control sheets, and vegetation nets; films including films for an electronic component use, electrically insulating films, films for metal plate lamination, and films for a glass display use; base films for a prism lens sheet in a liquid crystal display component, a touch panel, and a backlight; covers for a polarizer, an optical lens, and various gauges; anti-reflective films used for a windowpane of an automobile, an electric train, and others; base films for an explosion-proof film in a display; optical sheets for a substrate in a liquid crystal display, a substrate in an organic EL display device, a substrate in a color filter, a substrate in a touch panel, a substrate in a solar cell, and others; lens sheets used in an optical lens, a screen, and others; and materials used in electric/automobile manufacturing fields and agricultural/civil engineering/fishery fields.

EXAMPLES

The present invention will next be described in further detail with reference to examples. However, the present invention is not limited to these examples.

Production Example 1

Preparation of Amide Alcohol (1)

Into a glass flask equipped with a nitrogen inlet tube, a stirrer, and a thermometer, 3,500 g of ethyl acetate was charged, and the temperature was raised to 40° C. with nitrogen bubbling. Into the flask, a mixed solution of 1,968 g of monoethanolamine and 528 g of 28% sodium methoxide solution in methanol prepared in advance was added dropwise over 5 hours. The whole was maintained at 40° C. in a nitrogen atmosphere for 5 hours, and then unreacted ethyl acetate and ethanol were removed by desolventization, which affords 3,415 g of viscous liquid. The obtained viscous liquid had an amine value of 0.01 mg KOH/g with the amine value of sodium methoxide subtracted. The IR spectrum showed characteristic absorptions at 3,300 cm$^{-1}$ based on the O—H stretching vibration, at 3,100 cm$^{-1}$ based on the N—H stretching vibration, at 1,650 cm$^{-1}$ based on the C=O stretching vibration, and at 1,565 cm$^{-1}$ based on the N—H deformation vibration.

Production Example 2

Preparation of Amide Alcohol (2)

Into a glass flask equipped with a nitrogen inlet tube, a stirrer, and a thermometer, 3,205 g of methyl palmitate melted at 80° C. was charged. Into the flask, a mixed solution of 731 g of monoethanolamine and 64 g of 28% sodium methoxide solution in methanol prepared in advance was added dropwise over 5 hours. The whole was maintained at 80° C. in a nitrogen atmosphere for 5 hours, and then unreacted monoethanolamine and methanol were removed by desolventization, which affords 3,560 g of viscous liquid. The obtained viscous liquid had an amine value of 0.01 mg KOH/g with the amine value of sodium methoxide subtracted. The IR spectrum showed characteristic absorptions at 3,300 cm$^{-1}$ based on the O—H stretching vibration, at 3,100 cm$^{-1}$ based on the N—H stretching vibration, at 1,650 cm$^{-1}$ based on the C=O stretching vibration, and at 1,565 cm$^{-1}$ based on the N—H deformation vibration.

Production Example 3

Preparation of Alkylene Oxide Adduct of Amide Alcohol (1) (Ethylene Oxide Adduct)

Into a stainless-steel autoclave equipped with a nitrogen inlet tube, a stirrer, and a thermometer (hereinafter simply called "stainless-steel autoclave"), 1,060 g of amide alcohol (1) obtained in Production Example 1 was charged and the atmosphere was sufficiently substituted by nitrogen. After raising the temperature to 80° C., 6,000 g of ethylene oxide was introduced over 5 hours. The whole was aged for 2 hours at the same temperature, and the reaction was completed. Then, an adequate amount of Kyowaad (registered trademark) 700SL (manufactured by Kyowa Chemical Industry Co., Ltd.) was added as an adsorbent for adsorption, and the mixture was filtered to afford a pale yellow liquid. The hydroxy value was 80.1 mg KOH/g and the water content was 0.02%.

Production Example 4

Preparation of Alkylene Oxide Adduct of Amide Alcohol (2) (Ethylene Oxide Adduct)

Into a stainless-steel autoclave, 530 g of amide alcohol (1) obtained in Production Example 1 was charged and the atmosphere was sufficiently substituted by nitrogen. After raising the temperature to 80° C., 4,405 g of ethylene oxide was introduced over 5 hours. The whole was aged for 2 hours at the same temperature, and the reaction was completed. Then, an adequate amount of Kyowaad (registered trademark) 700SL (manufactured by Kyowa Chemical Industry Co., Ltd.) was added as an adsorbent for adsorption, and the mixture was filtered to afford a pale yellow liquid. The hydroxy value was 56.9 mg KOH/g and the water content was 0.01%.

Production Example 5

Preparation of Alkylene Oxide Adduct of Amide Alcohol (3) (Ethylene Oxide and Propylene Oxide Adduct)

Into a stainless-steel autoclave, 1,072 g of amide alcohol (1) obtained in Production Example 1 was charged and the atmosphere was sufficiently substituted by nitrogen. After raising the temperature to 80° C., 2,225 g of ethylene oxide was introduced over 4 hours, and the whole was aged for 2 hours at the same temperature. Next, the temperature was raised to 95° C., and 590 g of propylene oxide was introduced over 3 hours. The whole was aged for 1 hour at the same temperature. After cooling the mixture to 80° C., 3,120 g of ethylene oxide was introduced over 4 hours. The whole was aged for 2 hours at the same temperature, and the reaction was completed. Then, an adequate amount of Kyowaad (registered trademark) 700SL (manufactured by Kyowa Chemical Industry Co., Ltd.) was added as an adsorbent for adsorption, and the mixture was filtered to afford a pale yellow liquid. The hydroxy value was 81.0 mg KOH/g and the water content was 0.01%.

Production Example 6

Preparation of Alkylene Oxide Adduct of Amide Alcohol (4) (Ethylene Oxide Adduct)

Into a stainless-steel autoclave, 1,750 g of amide alcohol (2) obtained in Production Example 2 in a molten state at 80° C. was charged and the atmosphere was sufficiently substituted by nitrogen. After raising the temperature to 90° C., 3,250 g of ethylene oxide was introduced over 5 hours. The whole was aged for 2 hours at the same temperature, and the reaction was completed. Then, an adequate amount of Kyowaad (registered trademark) 700SL (manufactured by Kyowa Chemical Industry Co., Ltd.) was added as an adsorbent for adsorption, and the mixture was filtered to afford a yellow liquid. The hydroxy value was 65.7 mg KOH/g and the water content was 0.01%.

Production Example 7

Preparation of Block Copolymer 1

Into a stainless-steel autoclave, 3,741 g of poly(iso)butenylsuccinic anhydride (a saponification value of 90 mg KOH/g), 1,050 g of alkylene oxide adduct of amide alcohol (1) obtained in Production Example 3 (hereinafter abbreviated as amide alcohol EOA (1)) (a hydroxy value of 80.1 mg KOH/g), and 15 g of antioxidant (Irganox 1010) were charged. The atmosphere was sufficiently substituted by nitrogen, then the temperature was raised to 80° C., and 351 g of 48% KOH was added. Sufficient nitrogen substitution was further carried out, then the temperature was raised to 220° C., and the mixture was maintained at 220° C. under reduced pressure at 2 kPa or less with a trace amount of nitrogen bubbles for 3 hours. The product was a viscous polymer. The product had an ester value of 17.1 mg KOH/g. The IR spectrum of the product showed characteristic absorptions at 1,735 cm$^{-1}$ based on the C=O stretching vibration, at 1,560 cm$^{-1}$ based on the C(=O)O$^-$ antisymmetric stretching vibration, and at 1,709 and 1,770 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 1.

Production Example 8

Preparation of Block Copolymer 2

Into a stainless-steel autoclave, 4,320 g of poly(iso)butenylsuccinic anhydride (a saponification value of 62 mg KOH/g), 1,182 g of alkylene oxide adduct of amide alcohol (2) obtained in Production Example 4 (hereinafter abbreviated as amide alcohol EOA (2)) (a hydroxy value of 56.9 mg KOH/g), and 17 g of antioxidant (Irganox 1010) were charged. The atmosphere was sufficiently substituted by nitrogen, then the temperature was raised to 80° C., and 281 g of 48% KOH was added. Sufficient nitrogen substitution was further carried out, then the temperature was raised to 220° C., and the mixture was maintained at 220° C. under reduced pressure at 2 kPa or less with a trace amount of nitrogen bubbles for 3 hours. The product was a viscous polymer. The product had an ester value of 12.1 mg KOH/g. The IR spectrum of the product showed characteristic absorptions at 1,736 cm$^{-1}$ based on the C=O stretching vibration, at 1,562 cm$^{-1}$ based on the C(=O)O$^-$ antisymmetric stretching vibration, and at 1,709 and 1,771 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 2.

Production Example 9

Preparation of Block Copolymer 3

Into a stainless-steel autoclave, 3,242 g of poly(iso)butenylsuccinic anhydride (a saponification value of 90 mg KOH/g), 436 g of amide alcohol EOA (2) obtained in Production Example 4 (a hydroxy value of 56.9 mg KOH/g), 343 g of polyethylene glycol (a hydroxy value of 280 mg KOH/g), and 13 g of antioxidant (Irganox 1010) were charged. The atmosphere was sufficiently substituted by nitrogen, then the temperature was raised to 80° C., and 304 g of 48% KOH was added. Sufficient nitrogen substitution was further carried out, then the temperature was raised to 220° C., and the mixture was maintained at 220° C. under reduced pressure at 2 kPa or less with a trace amount of nitrogen bubbles for 3 hours. The product had an ester value of 25.3 mg KOH/g. The IR spectrum of the product showed characteristic absorptions at 1,736 cm$^{-1}$ based on the C=O stretching vibration, at 1,562 cm$^{-1}$ based on the C(=O)O$^-$ antisymmetric stretching vibration, and at 1,708 and 1,769 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 3.

Production Example 10

Preparation of Block Copolymer 4

Into a stainless-steel autoclave, 4,680 g of poly(iso)butenylsuccinic anhydride (a saponification value of 62 mg KOH/g), 673 g of amide alcohol EOA (1) obtained in Production Example 3 (a hydroxy value of 80.1 mg KOH/g), 107 g of Bisol 2EN (a bisphenol A-2EO adduct, a hydroxy value of 355 mg KOH/g) manufactured by Toho Chemical Industry Co., Ltd., and 17 g of antioxidant (Irganox 1010) were charged. The atmosphere was sufficiently substituted by nitrogen, then the temperature was raised to 80° C., and 304 g of 48% KOH was added. Sufficient nitrogen substitution was further carried out, then the temperature was raised to 220° C., and the mixture was maintained at 220° C. under reduced pressure at 2 kPa or less with a trace amount of nitrogen bubbles for 4 hours. The product was a viscous polymer. The product had an ester value of 14.9 mg KOH/g. The IR spectrum of the product showed characteristic absorptions at 1,735 cm$^{-1}$ based on the C=O stretching vibration, at 1,561 cm$^{-1}$ based on the C(=O)O$^-$ antisymmetric stretching vibration, and at 1,709 and 1,772 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 4.

Production Example 11

Preparation of Block Copolymer 5

Into a stainless-steel autoclave, 3,240 g of poly(iso)butenylsuccinic anhydride (a saponification value of 62 mg KOH/g), 428 g of amide alcohol EOA (1) obtained in Production Example 3 (a hydroxy value of 80.1 mg KOH/g), 292 g of Bisol 18EN (a bisphenol A-18EO adduct, a hydroxy value of 111 mg KOH/g) manufactured by Toho Chemical Industry Co., Ltd., and 13 g of antioxidant (Irganox 1010) were charged. The atmosphere was sufficiently substituted by nitrogen, then the temperature was raised to 80° C., and 211 g of 48% KOH was added. Sufficient nitrogen substitution was further carried out, then the temperature was raised to 220° C., and the mixture was maintained at 220° C. under reduced pressure at 2 kPa or less with a trace amount of nitrogen bubbles for 4 hours. The product was a viscous polymer. The product had an ester value of 17.2 mg KOH/g. The IR spectrum of the product showed characteristic absorptions at 1,735 cm$^{-1}$ based on the C=O stretching vibration, at 1,561 cm$^{-1}$ based on the C(=O)O$^-$ antisymmetric stretching vibration, and at 1,709 and 1,772 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 5.

Production Example 12

Preparation of Block Copolymer 6

Into a stainless-steel autoclave, 7,226 g of poly(iso)butenylsuccinic anhydride (a saponification value of 27 mg KOH/g), 609 g of amide alcohol EDA (1) obtained in Production Example 3 (a hydroxy value of 80.1 mg KOH/g), and 24 g of antioxidant (Irganox 1010) were charged. The atmosphere was sufficiently substituted by nitrogen, then the temperature was raised to 80° C., and 204 g of 48% KOH and 170 g of potassium acetate were added. Sufficient nitrogen substitution was further carried out, then the temperature was raised to 220° C., and the mixture was maintained at 220° C. under reduced pressure at 2 kPa or less with a trace amount of nitrogen bubbles for 5 hours. The product was a viscous polymer. The product had an ester value of 6.2 mg KOH/g. The IR spectrum of the product showed characteristic absorptions at 1,735 cm$^{-1}$ based on the C=O stretching vibration, at 1,561 cm$^{-1}$ based on the C(=O)O$^-$ antisymmetric stretching vibration, and at 1,709 and 1,772 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 6.

Production Example 13

Preparation of Block Copolymer 7

Into a stainless-steel autoclave, 7,164 g of poly(iso)butenylsuccinic anhydride (a saponification value of 27 mg KOH/g), 302 g of amide alcohol EOA (1) obtained in Production Example 3 (a hydroxy value of 80.1 mg KOH/g), 425 g of amide alcohol EOA (2) obtained in Production Example 4 (a hydroxy value of 56.9 mg KOH/g), and 24 g of antioxidant (Irganox 1010) were charged. The atmosphere was sufficiently substituted by nitrogen, then the temperature was raised to 80° C., and 202 g of 48% KOH and 140 g of potassium acetate were added. Sufficient nitrogen substitution was further carried out, then the temperature was raised to 220° C., and the mixture was maintained at 220° C. under reduced pressure at 2 kPa or less with a trace amount of nitrogen bubbles for 5 hours. The product was a viscous polymer. The product had an ester value of 6.1 mg KOH/g. The IR spectrum of the product showed characteristic absorptions at 1,735 cm$^{-1}$ based on the C=O stretching vibration, at 1,561 cm$^{-1}$ based on the C(=O)O$^-$ antisymmetric stretching vibration, and at 1,709 and 1,772 cm$^{-1}$ based on the C(=O)—N—C(=O) stretching vibration, and the disappearance of the absorption at 3,100 cm$^{-1}$ based on the N—H stretching vibration was ascertained. The obtained product is regarded as block copolymer 7.

Production Example 14

Preparation of Polypropylene Having One Acid-Modified Terminal 9,700 parts of low molecular weight polypropylene having an Mn of 3,300 and an average terminal double bond number of 0.9 and 300 parts of maleic anhydride were melted at 220° C. in a nitrogen gas atmosphere and reacted for 10 hours. Then, excess maleic acid was removed under reduced pressure at 200° C. for 4 hours, and maleic anhydride-modified polypropylene (polypropylene having one acid-modified terminal) was obtained. The product had an Mn of 3,400, a saponification value of 30 mg KOH/g, and an acid modification degree per molecule of 0.9.

Production Example 15

Preparation of Block Copolymer 8

Into a stainless-steel autoclave, 4,000 g of maleic anhydride-modified polypropylene (polypropylene having one acid-modified terminal) prepared in Production Example 14, 370 g of amide alcohol EOA (1) obtained in Production Example 3 (a hydroxy value of 80.1 mg KOH/g), 13 g of antioxidant (Irganox 1010), 90 g of 48% NaOH, and 100 g of ion water were charged. The atmosphere was sufficiently substituted by nitrogen, then the temperature was raised to 220° C., and the whole was stirred for 1 hour. The mixture was further maintained under reduced pressure at 2 kPa or less with a trace amount of nitrogen bubbles for 6 hours. The obtained product had good handleability and was a solid polymer. The product had an ester value of 7.5 mg KOH/g. The IR spectrum of the product showed characteristic absorptions at 1,737 cm$^{-1}$ based on the C=O stretching vibration and at 1,579 cm$^{-1}$ based on the C(=O)O$^-$ antisymmetric stretching vibration. The obtained product is regarded as block copolymer 8.

Production Example 16

Preparation of Polypropylene Having Both Terminals Acid-Modified 9,800 parts of low molecular weight polypropylene having an Mn of 8,900 and an average terminal double bond number of 1.6 and 200 parts of maleic anhydride were melted at 220° C. in a nitrogen gas atmosphere and reacted for 20 hours. Then, excess maleic acid was removed under reduced pressure at 200° C. for 4 hours, and maleic anhydride-modified polypropylene (polypropylene having both terminals acid-modified) was obtained. The product had an Mn of 9,000, a saponification value of 20 mg KOH/g, and an acid modification degree per molecule of 1.6.

Production Example 17

Preparation of Block Copolymer 9

Into a stainless-steel autoclave, 4,200 g of maleic anhydride-modified polypropylene prepared in Production Example 16 (polypropylene having both terminals acid-modified), 230 g of amide alcohol EOA (1) obtained in Production Example 3 (a hydroxy value of 80.1 mg KOH/g), 14 g of antioxidant (Irganox 1010), 55 g of potassium hydroxide, and 40 g of ion water were charged. The atmosphere was sufficiently substituted by nitrogen, then the temperature was raised to 220° C., and the whole was stirred for 1 hour. The mixture was further maintained under reduced pressure at 2 kPa or less with a trace amount of nitrogen bubbles for 6 hours. The obtained product was a solid polymer. The product had an ester value of 3.5 mg KOH/g. The IR spectrum of the product showed characteristic absorptions at 1,737 cm$^{-1}$ based on the C=O stretching vibration and at 1,579 cm$^{-1}$ based on the C(=O)O⁻ antisymmetric stretching vibration. The obtained product is regarded as block copolymer 9.

Production Example 18

Preparation of Block Copolymer 10

Into a stainless-steel autoclave, 3,380 g of poly(iso)butenylsuccinic anhydride (a saponification value of 62 mg KOH/g), 645 g of amide alcohol alkylene adduct (3) obtained in Production Example 5 (ethylene oxide and propylene oxide adduct) (a hydroxy value of 81.0 mg KOH/g), and 13 g of antioxidant (Irganox 1010) were charged. The atmosphere was sufficiently substituted by nitrogen, then the temperature was raised to 80° C., and 220 g of 48% KOH and 50 g of potassium acetate were added. Sufficient nitrogen substitution was further carried out, then the temperature was raised to 170° C., and the mixture was maintained at 170° C. under reduced pressure at 2 kPa or less with a trace amount of nitrogen bubbles for 3 hours. The product was a viscous polymer. The product had an ester value of 12.8 mg KOH/g. The IR spectrum of the product showed characteristic absorptions at 1,735 cm⁻¹ based on the C=O stretching vibration, at 1,560 cm⁻¹ based on the C(=O)O⁻ antisymmetric stretching vibration, and at 1,709 and 1,770 cm⁻¹ based on the C(=O)—N—C(=O) stretching vibration, and the disappearance of the absorption at 3,100 cm⁻¹ based on the N—H stretching vibration was ascertained. The obtained product is regarded as block copolymer 10.

Production Example 19

Preparation of Block Copolymer 11

Into a stainless-steel autoclave, 3,160 g of poly(iso)butenylsuccinic anhydride (a saponification value of 62 mg KOH/g), 300 g of amide alcohol alkylene adduct (4) obtained in Production Example 6 (ethylene oxide adduct) (a hydroxy value of 65.7 mg KOH/g), 232 g of bisphenoxyethanol fluorene, and 12 g of antioxidant (Irganox 1010) were charged. The atmosphere was sufficiently substituted by nitrogen, then the temperature was raised to 80° C., and 200 g of 48% KOH and 88 g of potassium acetate were added. Sufficient nitrogen substitution was further carried out, then the temperature was raised to 170° C., and the mixture was maintained at 170° C. under reduced pressure at 2 kPa or less with a trace amount of nitrogen bubbles for 6 hours. The product was a viscous polymer. The product had an ester value of 20.9 mg KOH/g. The IR spectrum of the product showed characteristic absorptions at 1,735 cm⁻¹ based on the C=O stretching vibration, at 1,561 cm⁻¹ based on the C(=O)O⁻ antisymmetric stretching vibration, and at 1,709 and 1,772 cm⁻¹ based on the C(=O)—N—C(=O) stretching vibration, and the disappearance of the absorption at 3,100 cm⁻¹ based on the N—H stretching vibration was ascertained. The obtained product is regarded as block copolymer 11.

Comparative Preparation Example 1

Preparation of Block Copolymer 12

Into a stainless-steel autoclave, 1,245 g of poly(iso)butenylsuccinic anhydride (a saponification value of 90 mg KOH/g), 750 g of polyethylene glycol (a hydroxy value of 75 mg KOH/g), 10 g of antioxidant (Irganox 1010), and 6 g of p-toluenesulfonic acid were charged. The atmosphere was sufficiently substituted by nitrogen, then the temperature was raised to 230° C., and the mixture was maintained for 4 hours. The product was a viscous polymer. The product had an acid value of 33 mg KOH/g. The IR spectrum of the product showed a characteristic absorption at 1,733 cm⁻¹ based on the C=O stretching vibration, but showed no characteristic absorption near 1,570 cm⁻¹ based on the antisymmetric stretching vibration of carboxylate anions. The obtained product is regarded as block copolymer 12.

Comparative Preparation Example 2

Preparation of Block Copolymer 13

Into a stainless-steel autoclave, 4,980 g of poly(iso)butenylsuccinic anhydride (a saponification value of 90 mg KOH/g), 2,000 g of polyethylene glycol (a hydroxy value of 112 mg KOH/g), and 36 g of antioxidant (Irganox 1010) were charged. The atmosphere was sufficiently substituted by nitrogen, then the temperature was raised to 230° C., and the mixture was maintained for 5 hours. The product was a viscous polymer. The product had an acid value of 35 mg KOH/g. The IR spectrum of the product showed a characteristic absorption at 1,733 cm⁻¹ based on the C=O stretching vibration, but showed no characteristic absorption near 1,570 cm⁻¹ based on the antisymmetric stretching vibration of carboxylate anions. The obtained product is regarded as block copolymer 13.

Comparative Preparation Example 3

Preparation of Block Copolymer 14

Into a stainless-steel autoclave, 616 g of poly(iso)butenylsuccinic anhydride (a saponification value of 91 mg KOH/g) and 162 g of 12-aminododecanoic acid were charged. The atmosphere was sufficiently substituted by nitrogen, and the mixture was maintained at 220° C. under reduced pressure at 2 kPa or less with a trace amount of nitrogen blow for 6 hours. The obtained product was a viscous polymer. Next, 57.5 g of the product, 33.5 g of polyethylene glycol (a hydroxy value of 74.8 mg KOH/g), 7.8 g of sodium dodecylbenzenesulfonate, 0.3 g of antioxidant (BHT), and 1.0 g of p-toluenesulfonic acid were charged. The atmosphere was sufficiently substituted by nitrogen, and the mixture was maintained at 230° C. under reduced pressure at 2 kPa or less with a trace amount of nitrogen blow for 5 hours. The obtained product was a viscous polymer. The product had an acid value of 0.05 mg KOH/g. The IR spectrum of the product showed characteristic absorptions at 1,734 cm⁻¹ and 1,639 cm⁻¹ based on the C=O stretching vibration and at 1,705 cm⁻¹ based on the C(=O)—N—C(=O) stretching vibration. The obtained product is regarded as block copolymer 14.

<Preparation of Specimens>

Specimens were prepared in accordance with the following procedure. Specimens containing no antistatic agent were prepared in a similar procedure as standard specimens used in the appearance evaluation and the transparency evaluation described later.

(1) Preparation of Specimens 1 (PP Film)

Polypropylene [NOVATEC PP FL6H (trade name, purchased from Japan Polypropylene Corporation)] as a thermoplastic resin was mixed with the block copolymers of the present invention in accordance with the formulations listed in Table 1. The mixtures were melted and mixed using a Labo Plastomill and a roller mixer (manufactured by Toyo Seiki Seisaku-sho, Ltd.) at 200° C., and then the mixed resins were formed into sheets having a thickness of 0.5 mm, a length of 60 mm, and a width of 60 mm with a press machine. Next, each sheet was heated in an oven, and was stretched to 5.0 times in length and 5.0 times in width to afford a film having a thickness of 20 µm.

(2) Preparation of Specimens 2 (PP Sheet)

Polypropylene [Prime Polypro F-300SP (trade name, purchased from Prime Polymer Co., Ltd.)] as a thermoplastic resin was mixed with the block copolymers of the present invention in accordance with the formulations listed in Table 1. The mixtures were subjected to a T-slot die extruder at a melting temperature of 200 to 240° C. to afford sheets having a thickness of 200 µm.

(3) Preparation of Specimen 3 (PE sheet)

Polyethylene [Sumikathene F-102 (trade name, purchased from Sumitomo Chemical Co., Ltd.)] as a thermoplastic resin was mixed with the block copolymer of the present invention in accordance with the formulation listed in Table 1. The mixture was subjected to a T-slot die extruder at a melting temperature of 200 to 220° C. to afford a sheet having a thickness of 200 µm.

(4) Preparation of Specimen 4 (PLA film)

Polylactic acid [LACEA H-400 (trade name, purchased from Mitsui Chemicals, Inc.)] as a thermoplastic resin was mixed with the block copolymer of the present invention in accordance with the formulation listed in Table 1. The mixture was melted and mixed using a Labo Plastomill and a roller mixer (manufactured by Toyo Seiki Seisaku-sho, Ltd.) at 200° C., and then the mixed resin was formed into a sheet having a thickness of 0.2 mm, a length of 60 mm, and a width of 60 mm with a press machine. Next, the sheet was heated in an oven, and was stretched to 3.0 times in length and 3.0 times in width to afford a film having a thickness of 20 µm.

<Evaluation Method>

(1) Antistatic Properties

Specimens prepared were left for 1 day in an environment at a temperature of 23° C. and a relative humidity of 50%, and then the specific surface resistances of the specimens were determined in the same condition in accordance with JIS-K6911 with a super insulation-resistance tester P-616 manufactured by Kawaguchi Electric Works Co., Ltd. Each specimen was immersed in water at 80° C. for 30 minutes, then the surface of the specimen was wiped with a clean cloth, and the specific surface resistance was determined. A smaller value indicates better antistatic properties. The target value for the specific surface resistance (Log Ω/□ (square)) is 13 or less.

The obtained results are also listed in Table 1.

(2) Resin Compatibility (Appearance)

A specimen with no antistatic agent and a specimen with the block copolymer were compared by visual observation. A specimen which had an appearance equivalent to that of the specimen with no antistatic agent and in which the block copolymer was compatible with a resin to result in a uniform appearance was evaluated as ○, a specimen that had no line, void, or fisheye but had a haze was evaluated as Δ, and a specimen that had lines, voids, fisheyes, or others and had poor appearance was evaluated as x.

The obtained results are also listed in Table 1.

(3) Transparency

The HAZE values of films and sheets prepared were determined with a HAZE meter (HAZEMETER TC-HIIIDPK manufactured by Tokyo Denshoku Co., Ltd.), and the difference ΔHAZE between a specimen with no antistatic agent and each specimen with the block copolymer was compared and evaluated. A smaller ΔHAZE indicates a closer transparency to that of the specimen with no antistatic agent. The target value for ΔHAZE is 10 or less.

The obtained results are also listed in Table 1.

TABLE 1

| Examples | | Antistatic agent | Amount compounded (% by mass) | Specimen | Specific surface resistance LogΩ/□ | | Appearance | ΔHAZE (%) |
|---|---|---|---|---|---|---|---|---|
| | | | | | Before washing | After washing | | |
| Example | 1 | Block copolymer 1 | 10 | 1 | 10.7 | 11.4 | ○ | 4 |
| | 2 | Block copolymer 2 | 10 | 1 | 11.8 | 12.3 | ○ | 3 |
| | 3 | Block copolymer 3 | 10 | 1 | 10.4 | 10.9 | ○ | 3 |
| | 4 | Block copolymer 4 | 10 | 1 | 11.5 | 12.3 | ○ | 2 |
| | 5 | Block copolymer 5 | 10 | 1 | 10.8 | 11.2 | ○ | 3 |
| | 6 | Block copolymer 6 | 10 | 1 | 11.5 | 12.1 | ○ | 3 |
| | 7 | Block copolymer 7 | 20 | 1 | 11.6 | 11.9 | ○ | 5 |
| | 8 | Block copolymer 1 | 5 | 1 | 12.3 | 12.7 | ○ | 2 |
| | 9 | Block copolymer 1 | 10 | 2 | 11.8 | 12.3 | ○ | 5 |
| | 10 | Block copolymer 2 | 10 | 3 | 11.9 | 12.6 | ○ | 6 |
| | 11 | Block copolymer 2 | 10 | 4 | 11.1 | 12.0 | ○ | 4 |
| | 12 | Block copolymer 8 | 10 | 1 | 10.9 | 11.3 | ○ | 2 |
| | 13 | Block copolymer 9 | 10 | 2 | 11.3 | 11.5 | ○ | 2 |
| | 14 | Block copolymer 10 | 10 | 1 | 10.3 | 10.5 | ○ | 4 |

TABLE 1-continued

| Examples | | Antistatic agent | Amount compounded (% by mass) | Specimen | Specific surface resistance LogΩ/□ Before washing | Specific surface resistance LogΩ/□ After washing | Appearance | ΔHAZE (%) |
|---|---|---|---|---|---|---|---|---|
| | 15 | Block copolymer 11 | 10 | 1 | 9.8 | 10.1 | ○ | 5 |
| Comparative Example | 1 | Block copolymer 12 | 10 | 1 | 14.8 | 14.8 | X | 15 |
| | 2 | Block copolymer 13 | 10 | 1 | 15.0 | 15.1 | ○ | 12 |
| | 3 | Block copolymer 14 | 10 | 1 | 12.5 | 14.3 | Δ | 17 |

As listed in Table 1, the results obtained in Example 1 to Example 15 showed that each specimen had substantially the same antistatic properties before and after the washing, had excellent appearance in which lines, voids, fisheyes, and others were not observed as with the specimen with no antistatic agent, and was excellent in transparency.

In contrast, the results obtained in Comparative Example 1 to Comparative Example 3 showed that each specimen did not satisfy all the preserved antistatic properties, the appearance, and the transparency.

These results show that the block copolymer of the present invention has excellent antistatic properties and preserved antistatic properties and does not impair the appearance and transparency of a resin into which the block copolymer is kneaded.

The invention claimed is:

1. A block copolymer obtained from a reaction between
(a) an acid-modified polyolefin and
(b) an alkylene oxide adduct of amide alcohol of General Formula (1):

R$^1$—CONH—R$^2$—O-(A$^1$O)$n$-H    (1)

where
R$^1$ is a C$_{1-21}$ linear or branched alkyl group or alkenyl group;
R$^2$ is a C$_{1-4}$ linear or branched alkylene group;
A$^1$ is a C$_{2-4}$ alkylene group; and
n is an integer of 1 to 100; wherein
part or all of acid groups of the block copolymer being neutralized by an alkaline substance.

2. The block copolymer according to claim 1, wherein (a) the acid-modified polyolefin is obtained by modifying one terminal of a polyolefin by an α,β-unsaturated carboxylic acid or an anhydride thereof.

3. The block copolymer according to claim 1 wherein (a) the acid-modified polyolefin is polybutenylsuccinic acid or an anhydride thereof.

4. The block copolymer according to claim 1, wherein the block copolymer is
a copolymer having an (A)-(B)-(A) bonding structure,
a copolymer having an (A)-(B) bonding structure, or
a copolymer mixture including both the copolymer having an (A)-(B)-(A) bonding structure and the copolymer having an (A)-(B) bonding structure; where (A) is a block derived from (a) the acid-modified polyolefin and (B) is a block derived from (b) the alkylene oxide adduct of amide alcohol.

5. A block copolymer of General Formula (2):

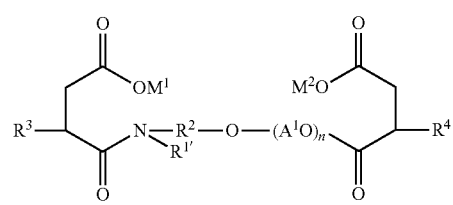

where
R$^{1'}$ is a C$_{2-22}$ linear or branched acyl group;
R$^2$ is a C$_{1-4}$ linear or branched alkylene group;
A$^1$ is a C$_{2-4}$ alkylene group; n is an integer of 1 to 100;
each of R$^3$ and R$^4$ is independently a polyolefin residue; and
each of M$^1$ and M$^2$ is independently a hydrogen atom, an alkali metal, an alkaline earth metal, ammonium, or organic ammonium.

6. A block copolymer having at least one of structures of Formula (4) and Formula (5):

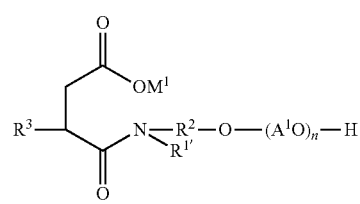

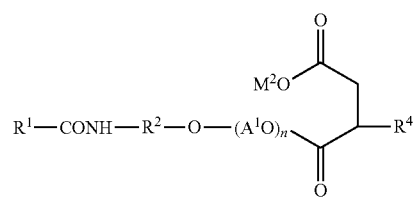

where
R$^1$ is a C$_{1-21}$ linear or branched alkyl group or alkenyl group;
R$^{1'}$ is a C$_{2-22}$ linear or branched acyl group;
R$^2$ is a C$_{1-4}$ linear or branched alkylene group;
A$^1$ is a C$_{2-4}$ alkylene group; n is an integer of 1 to 100;
each of R$^3$ and R$^4$ is independently a polyolefin residue;

each of $M^1$ and $M^2$ is independently a hydrogen atom, an alkali metal, an alkaline earth metal, ammonium, or organic ammonium.

7. An antistatic agent comprising:
the block copolymer according to claim 1.

8. The antistatic agent according to claim 7, further comprising:
at least one of block copolymers of General Formula (3) and General Formula (6):

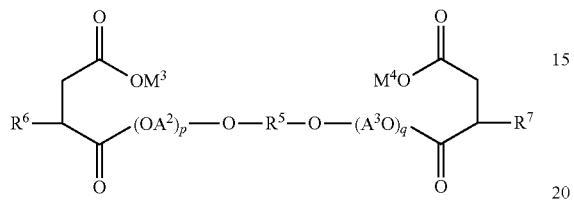
(3)

where
$R^5$ is a residue excluding hydroxy groups from a diol compound;
each of $A^2$ and $A^3$ is independently a $C_{2-4}$ alkylene group;
each of p and q is independently an integer of 0 to 100;
each of $R^6$ and $R^7$ is independently a polyolefin residue; and
each of $M^3$ and $M^4$ is independently a hydrogen atom, an alkali metal, an alkaline earth metal, ammonium, or organic ammonium

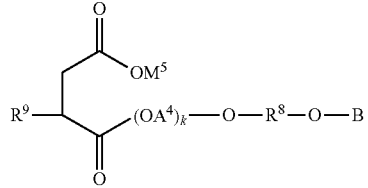
(6)

where
$R^8$ is a residue excluding hydroxy groups from a diol compound;
$A^4$ is a $C_2$ alkylene group;
k is an integer of 0 to 100;
$R^9$ is a polyolefin residue;
$M^5$ is a hydrogen atom, an alkali metal, an alkaline earth metal, ammonium, or organic ammonium; and B is a hydrogen atom or a structure of Formula (7):

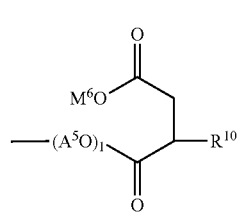
(7)

where
$A^5$ is a $C_{2-4}$ alkylene group;
l is an integer of 0 to 100;
$R^{10}$ is a polyolefin residue; and
$M^6$ is a hydrogen atom, an alkali metal, an alkaline earth metal, ammonium, or organic ammonium.

9. A thermoplastic resin composition comprising:
the antistatic agent according to claim 7.

10. The resin composition according to claim 9, wherein the thermoplastic resin is a polyolefin resin.

11. A film comprising:
the resin composition according to claim 9.

12. A sheet comprising:
the resin composition according to claim 9.

* * * * *